April 29, 1930. R. H. RAWSON 1,756,797
METHOD FOR RECOVERY OF SURPLUS PRESERVATIVES IN TREATMENT OF TIMBER
Filed June 3, 1926
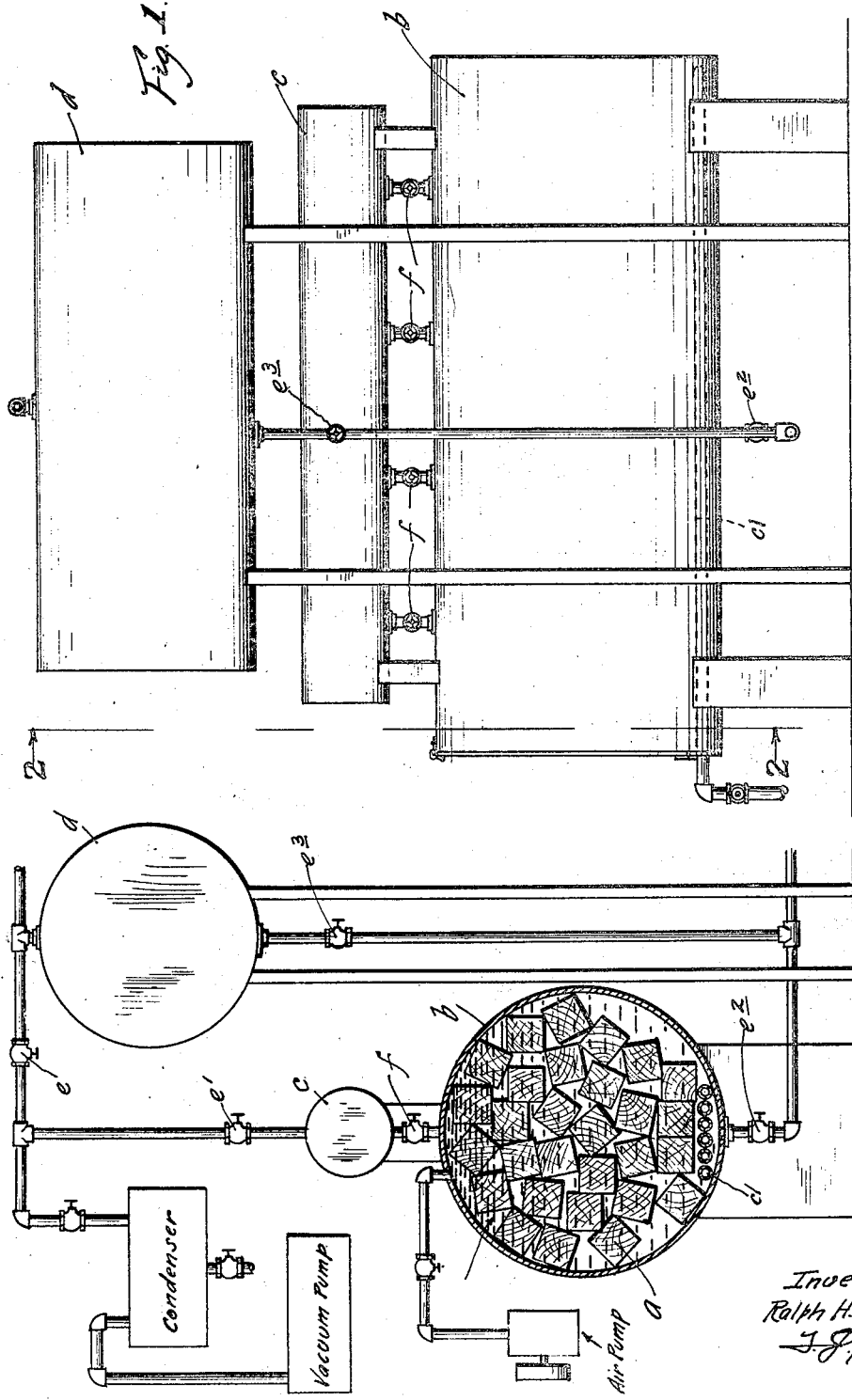

Patented Apr. 29, 1930

1,756,797

UNITED STATES PATENT OFFICE

RALPH H. RAWSON, OF PORTLAND, OREGON

METHOD FOR RECOVERY OF SURPLUS PRESERVATIVES IN TREATMENT OF TIMBER

Application filed June 3, 1926. Serial No. 113,417.

My invention relates to the art of preserving timber by treatment with a preservative cresote, for example.

The object of my invention is to recover the excess preservative and thus avoid waste.

In a great many cases the preservative treatment of timber as followed at present leaves an excess of the preservative in the cells of the timber; all required in most cases is that the walls of the cells shall be painted as it were, with the preservative material. The excess adds nothing to the life of the timber; but since the cost of preservative material is considerable, such excess incurs a waste. But not alone that; in many instances, it is necessary that the excess of preservative be removed from the timber, otherwise the timber will start to "bleed", and the exuded preservative will collect dust and render the material unsightly. Such is particularly noticeable, for example, in posts and poles, and therefore it is not only desirable, but a requirement that these articles shall be in such condition that they will not bleed in use.

Therefore, the object of my invention is not only to prevent waste of the preservative material and thus reduce the cost of preservative treatment, but also to produce articles which will not bleed the preservative in use, but keep the exterior surfaces thereof clean.

I attain my object by the method which consists in emptying the cells of the timber of excess preservative after the cells have become charged with the latter, by inducing the vaporization and expansion, to a large volume, of the moisture contained in the cells, accomplishing this result by holding the timber submerged in the preservative liquid in a closed vessel under a vacuum and for a substantial period, with the preservative heated and maintained at a temperature in excess of boiling water under the given vacuum.

My improvement may be combined with the steps in the present method of impregnating timber with preservative material, or separately, as a final step after such treatment.

In practicing my invention the pressure in the retort is first released and the preservative material contained therein is heated to and maintained at a temperature in excess of the boiling point of water under a given pressure; it being understood that the retort is completely filled with the preservative material so as to keep the timber completely submerged; and in that condition the preservative material constitutes an effective medium for transmitting the heat to and maintaining the timber at the proper temperature.

A vacuum is then created in the retort of from ten to thirty inches of mercury.

The purpose of these steps in my improvement is to induce the expansion of the vapors in the cells of the timber, and thus to expel therefrom and recover the excess of preservative material. The term vapor is to be understood as defining both air and moisture. My experiments demonstrated that neither heating nor vacuum alone would effectively serve my purpose, for it would not recover a sufficient amount of the excess preservative. I then conceived the idea of combining heating with vacuum and found by so doing a substantial and paying recovery of the excess preservative could be obtained. The success of my method is probably due to the fact that a given volume of water at 212° Fahrenheit under atmospheric pressure expands approximately 1600 times in changing to steam while the expansion of the same volume will be approximately 3200 times if the pressure is reduced to 15 inches of mercury.

Preferably, before applying the steps of my method I apply pressure to the preservative in the retort, which will not only fill the cells of the timber with the desired amount of preservative, but will also compress the vapors in the cells behind the preservative; and thus when the pressure is released a certain amount of initial expansion of the vapors so compressed in the cells may be effectively used to expel the excess preservative material.

Furthermore, where preliminary air pressure is used, following the preliminary warming period or "the seasoning period", the combination of heating and vacuum also causes a more complete expansion and exhaustion of the air confined in the wood structure, and a corresponding expulsion of the surplus preservative from its cells.

As the final step in my improvement I, preferably, remove the preservative from the retort, following the described heating under a vacuum, and then again create a vacuum in the retort after which the timber may be removed.

The details of practicing my invention in connection with one general method of preserving timber are hereinafter fully described with reference to the accompanying diagrammatic drawings of a suitable apparatus.

In the drawings:

Fig. 1 is a side elevation showing an apparatus comprising a retort in which the timber is placed, a vapor drum, and storage tank, and Fig. 2 is a transverse section, taken on the line 2—2 of Fig. 1, more plainly showing the relation of the different parts of the apparatus, and the retort being represented as filled with sticks of wood.

One generally followed process of treating timber with creosote consists in placing the green wood in a retort or cylinder where it is submerged in the creosote, and then applying heat and a vacuum to evaporate the moisture from the wood. After the wood has been sufficiently dried, the creosote is drawn off and air pressure is built up in the retort in order to permeate the wood with air under pressure so that it may serve to force out some of the preservative from the wood when the pressure is released and the air confined in the wood resumes its initial volume and pressure. The creosote is then returned to the retort, and pressure is applied for the purpose of forcing a further desired amount of the creosote into the cells of the wood, the timing of this treatment depending upon the amount of preservative to be injected into the wood.

The wood $a$ to be treated is placed in the retort $b$ and the latter is filled with enough creosote or other preservatives to submerge the wood. The preservative is then heated by any convenient means, for example by the coils $c^1$, to a temperature sufficiently high to tend to vaporize the moisture in the cells of the wood, and in that way the vaporized moisture is expelled by expansion due to a vacuum created in the retort by a vacuum pump or other suitable means; and the vapor is drawn off through a vapor drum $c$, and is trapped in a suitable condenser.

With wood that has already been seasoned, the above mentioned initial heating may be done either with or without a vacuum. The said initial heating has usually been found beneficial; and this initial heating may be accomplished by any means such as heating in the preservative, or by steaming.

After the wood is dried, the vacuum is released and the creosote preservative is forced into the storage tank $d$. Pressure is built up in the retort $a$ and the storage tank $d$ from the air pump. After the pressure is held for a length of time, the valves $e$, $e'$, $f$, $e^2$ and $e^3$ are opened and the creosote is allowed to flow into the retort $a$ with or without reducing the air pressure in either tank or retort, as deemed preferable by the operator.

When the retort is completely filled with the preservative, the storage tank $d$ is cut off at the valves $f$, $e^2$ and $e^3$ and more creosote is forced into the retort under pressure, the amount depending upon the quantity of preservative to be forced into the wood, after which the pressure is released.

The step which comprises my improved process consists in subjecting the wood, after the pressure has been released, to a vacuum, and simultaneously heating the wood through the medium of the preservative while still submerged in the latter.

The vaporizing of the moisture in the wood structure by heating under a vacuum greatly increases its volume as above pointed out; and this is the important effect; the expansion of the vapors so induced forces a substantial portion of the surplus preservatives from the wood.

My process may be rendered still more effective by entrapping air in the cells of the wood under pressure, so that the air when released and in regaining its normal volume under the conditions of temperature and pressure will itself serve to move a portion of the surplus of the preservative out of the cells of the wood. The entrapping of the air in the cells may be brought about by applying air pressure to the wood, and following this air pressure with pressure on the preservative in which the wood is submerged; or by the latter step alone thereby to compress the air which naturally exists in the wood.

Experiments have demonstrated that my improved method leaves the cell structure and exterior surface of the wood substantially free of excess preservative.

I claim:

1. In the preservative treatment of timber, the method of preventing subsequent bleeding which consists in applying a partial vacuum and simultaneously heating the timber through the medium of a liquid, with the timber submerged, to a temperature maintained in excess of that of boiling water under the given vacuum, whereby rapidly to vaporize and expand the moisture, imprisoned in the pores of the timber, to such volume as to crowd out substantially all preservative not retained by the walls of the pores.

2. In the preservative treatment of timber, the method of preventing subsequent bleeding which consists in applying a partial vacuum and simultaneously heating the timber through the medium of the preservative, with the timber submerged to a temperature maintained in excess of that of boiling water under the given vacuum, whereby rapidly to vaporize and expand the moisture imprisoned in the pores of the timber behind the preservative to such volume as to crowd out substantially all preservative not retained by the walls of the pores.

RALPH H. RAWSON.